(12) United States Patent
Gruteser et al.

(10) Patent No.: US 10,812,952 B2
(45) Date of Patent: *Oct. 20, 2020

(54) SYSTEMS AND METHODS FOR DETECTING DRIVER PHONE OPERATION USING VEHICLE DYNAMICS DATA

(71) Applicants: Rutgers, The State University of New Jersey, New Brunswick, NJ (US); Stevens Institute of Technology, Hoboken, NJ (US)

(72) Inventors: Marco Gruteser, Princeton, NJ (US); Richard P. Martin, Metuchen, NJ (US); Yingying Chen, Hoboken, NJ (US); Yan Wang, Jersey City, NJ (US)

(73) Assignees: RUTGERS, THE STATE UNIVERSITY OF NEW JERSEY, New Brunswick, NJ (US); STEVENS INSTITUTE OF TECHNOLOGY, Hoboken, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,111

(22) Filed: Apr. 2, 2018

(65) Prior Publication Data

US 2018/0295482 A1  Oct. 11, 2018

Related U.S. Application Data

(63) Continuation of application No. 14/751,086, filed on Jun. 25, 2015, now Pat. No. 9,936,358.

(60) Provisional application No. 62/017,217, filed on Jun. 25, 2014.

(51) Int. Cl.
| | | |
|---|---|---|
| *H04W 4/40* | (2018.01) | |
| *H04W 4/44* | (2018.01) | |
| *H04W 4/021* | (2018.01) | |
| *H04W 4/02* | (2018.01) | |
| *G01C 21/16* | (2006.01) | |

(52) U.S. Cl.
CPC .............. *H04W 4/40* (2018.02); *G01C 21/16* (2013.01); *H04W 4/021* (2013.01); *H04W 4/026* (2013.01); *H04W 4/027* (2013.01); *H04W 4/44* (2018.02)

(58) Field of Classification Search
CPC ....... H04W 4/046; H04W 4/02; H04W 4/008; H04W 4/021; H04W 4/023; H04W 4/027
USPC ...................... 455/456.3, 419, 574
See application file for complete search history.

(56) References Cited

U.S. PATENT DOCUMENTS

| | | | |
|---|---|---|---|
| 8,005,591 B2 * | 8/2011 | Poilbout ............ | B60G 17/0165 701/37 |
| 8,527,146 B1 | 9/2013 | Jackson et al. | |
| 9,936,358 B2 * | 4/2018 | Gruteser ................. | H04W 4/40 |
| 2002/0063016 A1 | 5/2002 | Kada | |
| 2005/0060069 A1 | 3/2005 | Breed et al. | |

(Continued)

*Primary Examiner* — Inder P Mehra
(74) *Attorney, Agent, or Firm* — Fox Rothschild LLP

(57) ABSTRACT

A method for determining the position in a vehicle of a first device in communication with a microprocessor may include receiving, at the microprocessor, a first set of inertial data from at least one sensor of the first device; receiving, at the microprocessor, a second set of inertial data from at least one sensor of a reference device disposed within the vehicle; and determining, using the microprocessor, the position of the first device in the vehicle by comparing the first set of inertial data with the second set of inertial data.

13 Claims, 9 Drawing Sheets

(56) References Cited

U.S. PATENT DOCUMENTS

| | | | |
|---|---|---|---|
| 2010/0302378 A1* | 12/2010 | Marks | G06F 3/0304 |
| | | | 348/169 |
| 2011/0199293 A1* | 8/2011 | Liu | G06F 3/04845 |
| | | | 345/156 |
| 2013/0158941 A1 | 6/2013 | Yang et al. | |
| 2014/0039751 A1* | 2/2014 | Hart | B60R 16/03 |
| | | | 701/33.3 |
| 2014/0125525 A1* | 5/2014 | Kane | G08B 21/0247 |
| | | | 342/450 |
| 2014/0274023 A1 | 9/2014 | Rajeevalochana et al. | |
| 2014/0371988 A1 | 12/2014 | Muramatsu et al. | |
| 2015/0006099 A1 | 1/2015 | Pham et al. | |
| 2015/0288788 A1* | 10/2015 | Liu | H04M 1/0264 |
| | | | 455/414.1 |
| 2015/0308849 A1* | 10/2015 | Sinaguinan | G01C 21/362 |
| | | | 701/430 |
| 2015/0327034 A1* | 11/2015 | Abramson | H04L 67/12 |
| | | | 455/419 |
| 2015/0382156 A1 | 12/2015 | Gruteser et al. | |

\* cited by examiner

SYSTEMS AND METHODS FOR DETECTING DRIVER PHONE OPERATION USING VEHICLE DYNAMICS DATA

RELATED APPLICATIONS AND CLAIM OF PRIORITY

This application is a continuation of U.S. patent application Ser. No. 14/751,086, filed Jun. 25, 2015, which claims priority under 35 U.S.C. § 119(e) of U.S. Provisional Application No. 62/017,217, filed Jun. 25, 2014. The contents of the applications are incorporated herein by reference in their entirety.

STATEMENT REGARDING FEDERALLY SPONSORED RESEARCH OR DEVELOPMENT

This invention was made with Government support under grant numbers CNS-1040735 and CNS-0845896 awarded by the National Science Foundation. The government has certain rights in the invention.

STATEMENT OF THE TECHNICAL FIELD

The inventive arrangements relate to systems and methods for capturing differences in centripetal acceleration between smartphone embedded sensors due to vehicle dynamics, combined with angular speed, due to vehicle dynamics for determining an approximate location of a mobile device in a confined area. More particularly, the inventive arrangements concern systems and methods leveraging existing smartphone sensors to determine on which side of a car, a mobile communication device is being used.

DESCRIPTION OF THE RELATED ART

Distinguishing driver and passenger phone use is a building block for a variety of applications but its greatest promise arguably lies in helping reduce driver distraction. Cell phone distractions have been a factor in high-profile accidents and are associated with a large number of automobile accidents. For example, a National Highway Traffic Safety Administration ("NHTSA") study identifies cell phone distraction as a factor in crashes that led to 995 fatalities and 24,000 injuries in 2009. This has led to increasing public attention and the banning of handheld phone use in several US states as well as many countries around the world.

Unfortunately, an increasing amount of research suggests that the safety benefits of handsfree phone operation are marginal at best. The cognitive load of conducting a cell phone conversation seems to increase accident risk, rather than the holding of a phone to the ear. Of course, texting, email, navigation, games and many other apps on smartphones are also increasingly competing with driver attention and pose additional dangers. This has led to a renewed search for technical approaches to the driver distraction problem. Such approaches run the gamut from improved driving mode user interfaces, which allow quicker access to navigation and other functions commonly used while driving, to apps that actively prevent phone calls. In between these extremes lie more subtle approaches: routing incoming calls to voicemail or delaying incoming text notifications.

All of these applications would benefit from and some of them depend on automated mechanisms for determining when a cell phone is used by a driver. Prior research and development has led to a number of techniques that can determine whether a cell phone is in a moving vehicle—for example, based on cell phone handoffs, cell phone signal strength analysis, or speed as measured by a Global Positioning System ("GPS") receiver. The latter approach appears to be the most common among apps that block incoming or outgoing calls and texts. That is, the apps determine that the cell phone is in a vehicle and activate blocking policies once speed crosses a threshold. Some apps require the installation of specialized equipment in an automobile's steering column, which then allows blocking calls/text to/from a given phone based on car's speedometer readings, or even rely on a radio jammer. None of these solutions, however, can automatically distinguish a driver's cell phone from a passenger's.

While there does not exist any detailed statistics on driver versus passenger cell phone use in vehicles, a federal accident database reveals that about 38% of automobile trips include passengers. Not every passenger carries a phone—still this number suggests that the false positive rate when relying only on vehicle detection would be quite high. It would probably be unacceptably high even for simple interventions such as routing incoming calls to voicemail. Distinguishing drivers and passengers is challenging because car and phone usage patterns can differ substantially. Some might carry a phone in a pocket, while others place it on the vehicle console. Since many vehicles are driven mostly by the same driver, one promising approach might be to place a Bluetooth device into the vehicles, which allows the phone to recognize it through the Bluetooth identifier. Still, this cannot cover cases where one person uses the same vehicle as both driver and passenger, as is frequently the case for family cars. Also, some vehicle occupants might pass their phone to others, to allow them to try out a game, for example.

Furthermore, some prior art methods utilize multiple sensors (including accelerometer, gyroscope, and microphone) in smartphones to capture the features of driver's movement to detect driver phone use. However, this approach is sensitive to the behavior of each individual, and may depend on the position where drivers carry the phone, which is not practical. Certain other methods rely on vehicle's capability to connect to the audio system via Bluetooth, which may not be present in all vehicles.

Hence, there exists a need for minimizing additional infrastructure, and using existing sensors and devices, for the detection of the driver using a cell phone.

SUMMARY OF THE INVENTION

The system and method for determining a location, in a vehicle, of a first device in communication with a microprocessor is disclosed. The microprocessor may be configured to receive a first set of inertial data from at least one sensor of the first device and a second set of inertial data from at least one sensor of a reference device disposed within the vehicle. The microprocessor may determine the position of the first device in the vehicle by based on at least one difference between the first set of inertial data and the second set of inertial data. The first device may be a mobile communication device. The reference device may be a device fixed at a reference point in the vehicle (such as cigarette lighter configured to transmit data to the microprocessor), a device connected to an on-board diagnostics system of the vehicle, a component of the vehicle or a second device. The microprocessor may be associated with the first device, the reference device, or a third device in communication with the first device and/or the reference device. The at least one sensor may be an accelerometer or a gyroscope.

In an embodiment, the microprocessor may also align a coordinate system of the first device with a coordinate system of the second device by obtaining a representation of orientation using the first set of inertial data, and rotating the coordinate system of the first device using the representation of orientation.

In certain embodiments, determining the position of the first device may further include detecting whether the first device located on a driver side or a passenger side of vehicle. The microprocessor may also modify at least one feature of the first device upon detecting that whether the first device located on a driver side or a passenger side. Examples of modifying the at least one feature may include silencing incoming communication notifications of the first device; silencing notifications of the first device; switching to a driver-friendly user interface; or diverting incoming communications to another device. In at least one embodiment, an alarm may be triggered at the first device, the reference device, and/or the device associated with the microprocessor upon detecting that the mobile device is located at the driver side and is in an active communication mode.

In an embodiment, the first set of inertial data may include a plurality of centripetal accelerations of the first device associated with the vehicle making at least one turn, and the second set of inertial data may include a plurality of centripetal accelerations of the reference device associated with the vehicle making the at least one turn.

In some embodiments, determining the position of the first device by comparing the first set of inertial data with the second set of inertial data may include determining whether the vehicle is making a right turn or a left turn; and processing the plurality of centripetal accelerations of the first device and the plurality of centripetal accelerations of the reference device for the at least one turn to determine whether a cumulative difference between the plurality of centripetal accelerations of the first device and the plurality of centripetal accelerations of the reference device is positive or negative. The method may further include determining that the first device is on a driver side of the vehicle if it is determined that the vehicle is making a right turn and the cumulative difference is positive, or if it is determined that the vehicle is making a left turn and the cumulative difference is negative. Alternatively and/or additionally, the method may include determining that the first device is on a passenger side of the vehicle if it is determined that the vehicle is making a right turn and the cumulative difference is negative or if it is determined that the vehicle is making a left and the cumulative difference is positive. The method may further include estimating a centripetal acceleration at a reference point from the reference device located at a point other than the reference point.

In at least one embodiment, processing the plurality of centripetal accelerations of the first device and the plurality of centripetal accelerations of the reference device for the at least one turn may include performing at least one of the following: noise filtering, trace synchronization, or acceleration adjustment. Alternatively and/or additionally, the method may also include processing inertial data plurality of turns (for example, by performing a majority voting process for the plurality of turns) to improve accuracy of determining the position of the first device.

In another aspect of the disclosure, system and method for estimating an orientation, in a vehicle, of a first device in communication with a microprocessor is disclosed. The method may include receiving a first set of inertial data form at least one sensor of the first device at the microprocessor, processing the first set of inertial data to obtain an orientation of the first device. Obtaining the orientation may include estimating a gravity vector from the first set of inertial data; estimating a moving vector of the vehicle from the first set of inertial data; and applying a right hand vector rule to obtain the orientation. In an embodiment, the method may also include using the rotation matrix to translate the first inertial data into a coordinate system of the vehicle. In some embodiments, the translated inertial data may be used to determine at least one of the following: a centripetal acceleration of the vehicle, or a longitudinal acceleration of the vehicle.

In an embodiment, estimating the gravity vector may include estimating a gravity acceleration from the first set of inertial data, and normalizing the gravity acceleration to generate the gravity vector, and/or estimating the moving vector of the vehicle may include using a gyroscope sensor of the first device to determine whether or not the vehicle is driving in a straight line.

In another aspect of the disclosure, system and method for translating orientation-dependent sensor measurements from a device of unknown orientation inside a vehicle into a vehicle coordinate frame is disclosed. The method may include receiving a first set of inertial data from at least one sensor of the first device; estimating a gravity vector from the first set of inertial data; estimating a moving vector of the vehicle from the first set of inertial data; and using the gravity vector and the moving vector to translate said sensor measurements into a vehicle coordinate frame.

Another aspect of the present invention includes a system for estimating an orientation in a vehicle of a first device, the system comprising: a non-transitory, computer readable memory; one or more processors; and a computer-readable medium containing programming instructions that, when executed by the one or more processors, cause the system to: receive a first set of inertial data from at least one sensor of the first device; and process the first set of inertial data to determine the orientation of the first device with respect to the vehicle along one or more axes.

According to one embodiment of this system, the programming instructions that when executed cause the system to determine the orientation of the first device comprise programming instructions to:

estimate a gravity vector from the first set of inertial data;

estimate a moving vector of the vehicle from the first set of inertial data; and apply a right hand vector rule to determine the orientation.

Yet another aspect of the present invention includes a method for translating orientation-dependent sensor measurements from a device of unknown orientation inside a vehicle into a vehicle coordinate frame, the method comprising:

receiving a first set of inertial data from at least one sensor of the first device;

estimating a gravity vector from the first set of inertial data;

estimating a moving vector of the vehicle from the first set of inertial data; and using the gravity vector and the moving vector to translate said sensor measurements into a vehicle coordinate frame.

In another embodiment a system is provided for translating orientation-dependent sensor measurements from a device of unknown orientation inside a vehicle into a vehicle coordinate frame, the system comprising:

a non-transitory, computer readable memory;

one or more processors; and a computer-readable medium containing programming instructions that, when executed by the one or more processors, cause the system to:

receive a first set of inertial data from at least one sensor of the first device;

estimate a gravity vector from the first set of inertial data;

estimate a moving vector of the vehicle from the first set of inertial data; and use the gravity vector and the moving vector to translate said sensor measurements into a vehicle coordinate frame.

BRIEF DESCRIPTION OF THE DRAWINGS

Embodiments will be described with reference to the following drawing figures, in which like numerals represent like items throughout the figures, and in which.

DETAILED DESCRIPTION

Figure 1A:
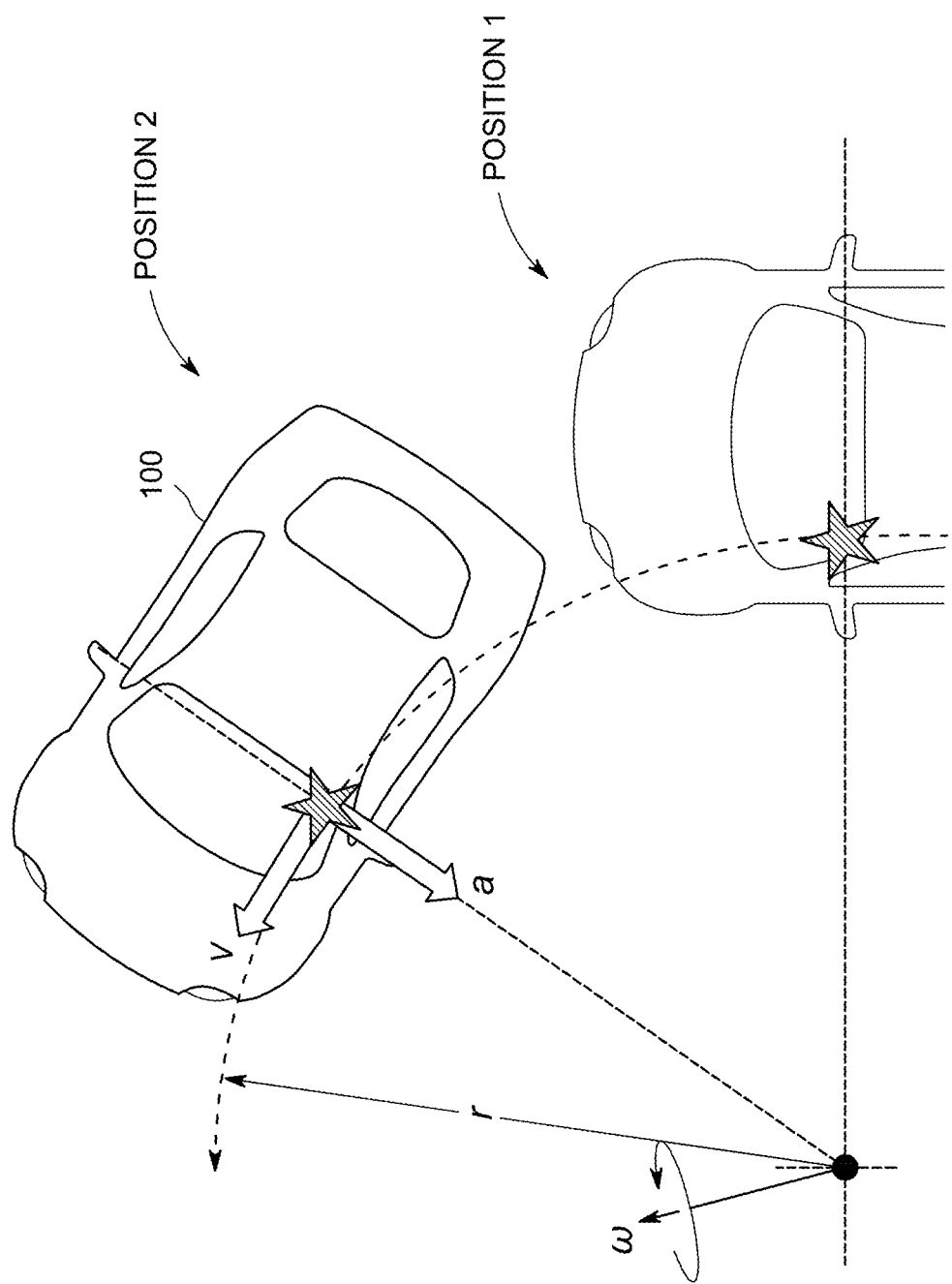
FIG. 1A is a schematic illustration of centripetal acceleration, tangential speed, and the radius of the circular movement of a vehicle.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

A "mobile communications device" refers to a portable communications device that includes a speaker, a microphone, a processor and non-transitory, computer-readable memory. The memory may contain programming instructions in the form of a software application that, when executed by the processor, causes the device to connect with other devices using audio and/or video communication channels. Examples include, but are not limited to, a mobile phone, a Personal Digital Assistant ("PDA"), a portable computer, a portable game station, a portable telephone and/or a mobile phone with smart device functionality (e.g., a Smartphone). The MCD may further include embedded sensors, such as acceleration and velocity sensors. Embedded MCD sensors are well known in the art, and therefore will not be described in detail herein. Still, it should be understood that any known embedded sensors can be used with the present disclosure without limitation.

Although the current disclosure is described using an MCD disposed in a vehicle, as an example, it will be understood to those skilled in the art, that the principles of the disclosure can be used for locating other devices with embedded sensors within any given space.

A vehicle can include, but is not limited to, a car, truck, van, bus, tractor, boat or plane.

A "turn" refers to an event that may cause a change in the orientation of the vehicle. Examples may include, without limitation, a right turn event, a left turn event, a lane change event, following a curved road, etc., all of which may occur in a forward or reverse motion.

Introduction

The present disclosure generally relates to a low-infrastructure approach that senses acceleration due to vehicle dynamics to decide a mobile communication device's position within the vehicle. The location of the mobile communication device within the vehicle is then used as a heuristic to determine whether the mobile communication device is used by a driver or a passenger. The invention leverages the fact that the centripetal acceleration of an object within a vehicle varies depending on the position in the vehicle, and uses existing vehicle infrastructure. Hence, by comparing the measured acceleration from the mobile communication device with the acceleration measured at a reference point inside the vehicle, the mobile communication device is adapted to determine whether it is located left or right of the reference within the vehicle (i.e. on the driver or passenger side). In certain embodiments, this technique can operate in conjunction with the bump sensing technique for determining front or rear location disclosed in U.S. patent application Ser. No. 13/912,880, the disclosure of which is incorporated by reference.

While centripetal acceleration differentials have been studied, the present disclosure addresses many unique challenges that may arise utilizing the differential for mobile communication device localization in practice. Example of such problems include, for example, noise in the embedded sensors and effect of unpredictable driving environments; the additional infrastructure needed beyond the mobile communication device; and pose (orientation) dependency of sensor readings in smartphones. The present disclosure presents solutions to address these challenges by utilizing a centripetal acceleration based driver phone use sensing algorithm that mitigates the noise of the sensor readings and unpredictable geometries, such as different size of turns, driving speed, and driving styles. Specifically, in an embodiment, the present disclosure determines the in-vehicle position of a mobile communication device using its sensors by monitoring position dependent differences in acceleration forces and comparing them with a vehicle reference reading, without a need for additional infrastructure, and with increased accuracy.

Additionally, disclosed embodiments include multiple possible designs for providing a vehicle reference reading, including, without limitation, reference devices such as a cigarette lighter adapter with accelerometer sensor, an on-board diagnostics (OBD-II) port adapter that may provide vehicle speed reference readings over Bluetooth, and opportunistic use of other devices such as a mobile communication devices as a reference.

The disclosure, in certain embodiments, further employs algorithms that use these various reference inputs, and compensate for bias in the reference measurements by taking into account data from both left and right turns of a vehicle.

Discussion of Example Embodiments

Embodiments will now be described with respect to FIGS. 1-6. Embodiments of the present disclosure will be described herein in relation to vehicle applications. The present invention is not limited in this regard, and thus can be employed in various other types of applications in which a location of a mobile communication device (MCD) within a confined space needs to be determined (e.g., business meeting applications and military applications).

In the vehicle context, embodiments generally relate to MCD location determining systems (MLDS) and methods for employing embedded MCD sensors for determining which car seat an MCD is being used. Notably, the present systems and methods do not require the addition of dedicated infrastructure to the vehicle or the MCD.

Referring now to FIG. 1A, there is provided a schematic illustration of the relationship between centripetal acceleration, tangential speed, angular speed, and the radius of a circular movement of a vehicle 100. When a vehicle makes a turn, it may experience a centripetal force, having its direction orthogonal to the direction of movement of the vehicle and toward the center of the turn. This centripetal force generates a centripetal acceleration a also pointing toward the center of the curve. Assuming a turn following a perfect circle, the centripetal acceleration ($\alpha$) is obtained by using the angular speed ($\omega$), the tangential velocity (v) and the radius (r) of the turn, using the following equation:

$$a = \omega v = \omega^2 r = \frac{v^2}{r} \quad (1)$$

Figure 1B:
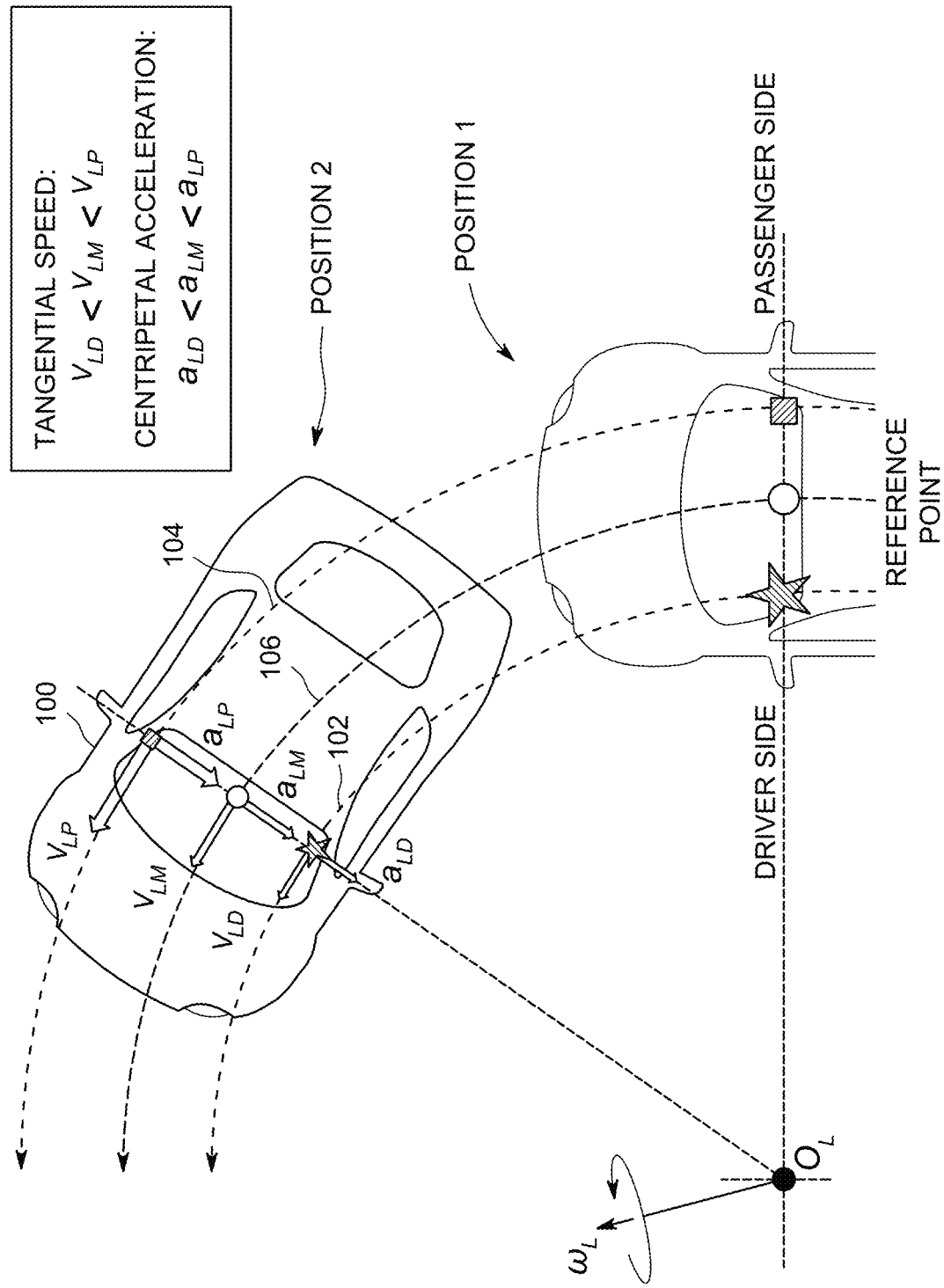
FIG. 1B is a schematic illustration of different centripetal accelerations of different in-vehicle positions.

As shown in FIG. 1B, based on equation (1), phones located on passenger- and driver-side positions inside the vehicle have the same angular speed but follow circles of different radii. Different radii at constant angular speed thus leads to differences in centripetal acceleration on these positions. Hence, measuring the centripetal acceleration differences with MCD sensors may be helpful in determining driver phone use.

As illustrated in FIG. 1B, when a vehicle 100 is making a left turn (from position 1 to position 2), the driver side 102 has smaller centripetal acceleration ($\alpha_{LD}$) than that at the vehicle center 106 ($\alpha_{LM}$), which in turn has smaller centripetal acceleration than that at the passenger side 104 ($\alpha_{LP}$). In general, compared to the center 106 of the vehicle the driver phone always has a smaller radius (and thus experiences smaller centripetal acceleration) when the vehicle makes a left turn and a larger radius (corresponding to larger centripetal acceleration) when the vehicle makes a right turn. Therefore, if the phone's centripetal acceleration is found to be smaller than that at the center in a left turn, or larger in the case of a right turn, then the phone is on the left side of the vehicle. The MLDS then utilizes the difference in centripetal acceleration experienced at different positions within the vehicle to distinguish driver phone use from that of passengers.

It should be noted that the current embodiments work under real-world driving scenarios with various turn sizes and driving speeds, because the MLDS utilizes the difference of centripetal acceleration from the same turn to sense the driver phone use. In contrast, while the difference of the phone's centripetal acceleration obtained by comparing previous left and right turns help to determine whether the phone is at the driver side, this approach requires turns made by the vehicle to have the same radii, which is not practical in real-road driving environments.

In certain embodiments, the MLDS may utilize a reference centripetal acceleration, where the reference device (not shown here) is located near the center of the vehicle. However, it will be understood that other reference device locations may be used without deviating from the principles of the current disclosure.

In certain embodiments, the MLDS may use existing vehicle infrastructure as a reference device, to obtain the reference centripetal acceleration value. For example, in certain embodiments, the MLDS may obtain reference centripetal from a low-cost cigarette lighter adapter containing an accelerometer located near the center of the vehicle. The location of the cigarette lighter charger is ideal for the reference point since it is located at the center of the front seats. The MLDS distinguishes driver phone use from passengers by comparing the centripetal acceleration of the phone to that of the reference point. The centripetal acceleration of the reference point may be obtained from the cigarette lighter adapter's accelerometer.

In certain other embodiments, the MLDS may calculate the centripetal acceleration at the vehicle's center using the speed of the vehicle's center obtained from the vehicle's OBD-II port adapter. The OBD-II interface has been made mandatory for all vehicles sold in the United States after 1996, and inexpensive OBD-II port adapters with Bluetooth connection are readily avail-able in the market. The MLDS may utilize a low cost OBD-II port adapter, which allows the MLDS to collect the vehicle's speed from the OBD-II port adapter via a USB connection, to use the speed of the vehicle as the reference point. The centripetal acceleration of the car's center (i.e., reference point) is the product of the OBD-II speed and the angular speed measured by the target phone. The driver phone use may be detected by comparing the phone's centripetal acceleration to that of the vehicle's center.

In certain other embodiments, the MLDS may utilize the centripetal acceleration of a passenger phone as a reference (when there are multiple occupants in the car). Other suitable reference devices may be used in accordance with the principles disclosed here. The MLDS may use one or more reference devices. For example, in an embodiment, two types of reference data may be involved: the centripetal acceleration of the vehicle (reference acceleration from the cigarette lighter adapter), and the speed of the vehicle (reference speed from OBD-II port adapter).

In an embodiment, the MLDS may receive the reference readings from the reference device over Bluetooth. Other examples include, without limitation, can include, but is not limited to, Near Field Communication ("NFC"), InfraRed ("IR") technology, Wireless Fidelity ("Wi-Fi") technology, Radio Frequency Identification ("RFID") technology and ZigBee technology.

Figure 2A:
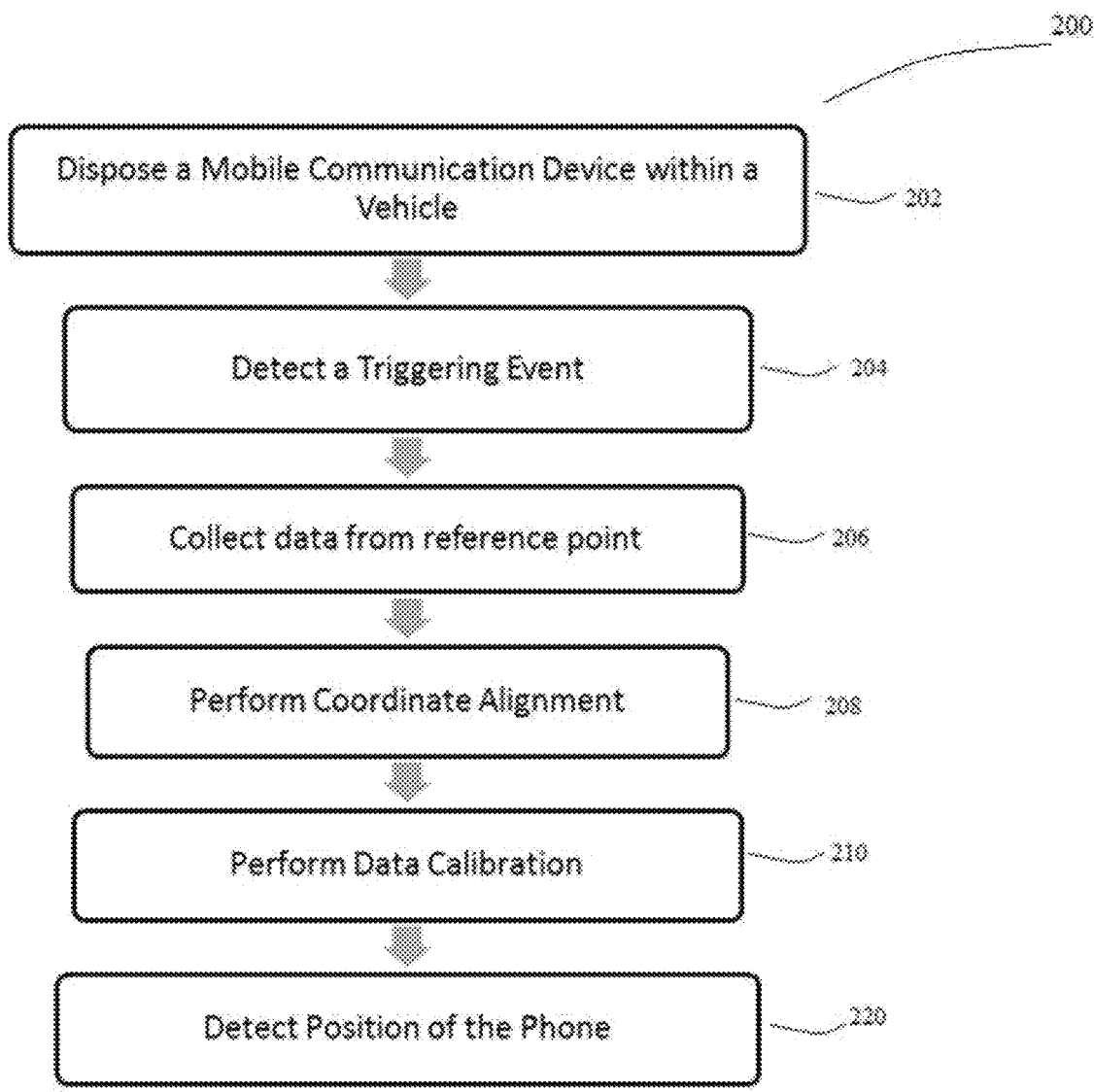
FIG. 2A is a flow diagram of an example communication device location determining method for determining on which an approximate location of a communication device within a confined space.

Referring now to FIG. 2A, there is provided a flow diagram of an example method 200 for determining the location of an MCD within a confined space, according to an embodiment.

In step 202, an MCD is disposed within a vehicle (e.g., vehicle 100 of FIG. 1). Next in step 204, the MLDS may start collecting inertial data from the sensors of the MCD. Examples of inertial data may include, without limitation, acceleration and/or angular speed of the mobile device derived from readings collected from the accelerometer and/or gyroscope of the MCD.

In certain embodiments, an event may occur triggering the MLDS operations. For example, an incoming communication (e.g., a call, text message or email) at the MCD; a registration and/or auto-pairing of the MCD with the audio unit or other equipment of the vehicle and/or MLDS; detection of movement of the MCD (e.g., through the use of an accelerometer) and/or vehicle; detection/establishment of a bluetooth connection when the driver enters the vehicle (e.g. using a reference device such as a cigarette lighter adapter); and/or detecting that the MCD is in proximity of the vehicle. For example, the MLDS may start collecting readings from the accelerometer and gyroscope of the MCD upon detecting a Bluetooth connection (when the driver enters the car.

In step 206, upon detecting that the vehicle is starting to make a turn (based on the readings collected in step 204), the MLDS may collect the acceleration and/or angular speed information with respect to the reference point (e.g., acceleration from cigarette lighter adapter or speed from the OBD-II port adapter).

Figure 4A:
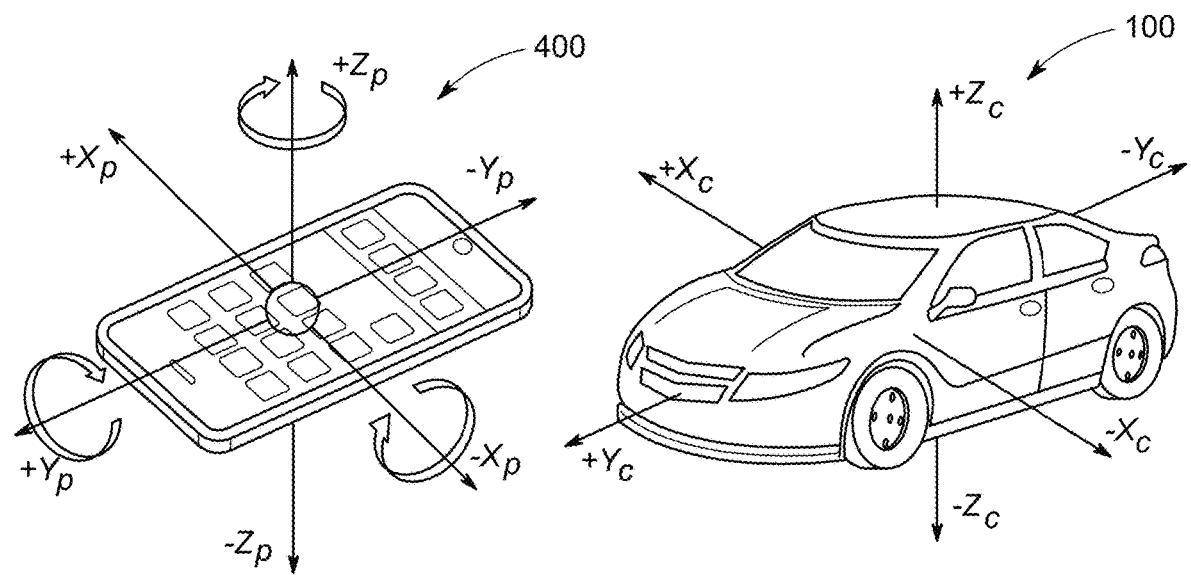
FIG. 4A is a schematic illustration of the coordinate systems of a smartphone and a vehicle.

Vehicle dynamics (for e.g., the turning of a vehicle) may be determined by the MLDS by utilizing a 3-axis accelerometer and/or a 3-axis gyroscope embedded in the MCD to obtain the centripetal acceleration while the vehicle makes a turn. There may be two coordinate systems, one for the smartphone ({Xp, Yp, Zp}) and the other for the vehicle ({Xc, Yc, Zc}), as illustrated in FIG. 4A. For illustrative purposes, the MCD's coordinate system is assumed to be already aligned with the vehicle (discussed below with respect to step 208).

As illustrated in FIG. 4A, Xc points to the passenger side of the vehicle 100 (i.e., opposite side of the driver). The X-axis acceleration reading on the MCD 400 reflects the centripetal acceleration (i.e., $\alpha$) when the vehicle makes a turn.

Figure 5:
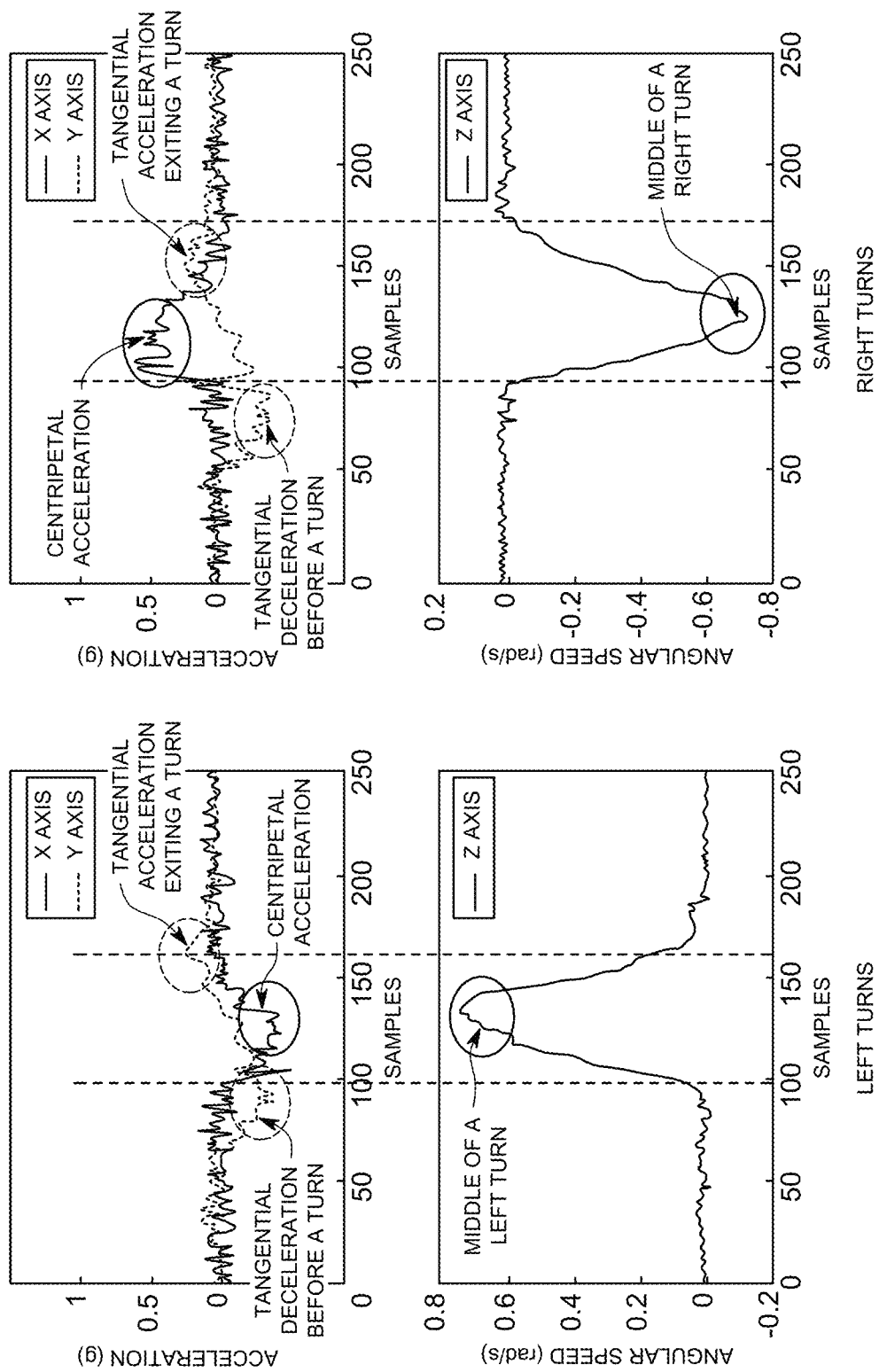
FIG. 5 comprises two graphs illustrating accelerometer and gyroscope readings when a smartphone is aligned with the vehicle undergoing a left and a right turn, respectively.

In certain embodiments, the MLDS may determine the vehicle dynamics by deriving the centripetal acceleration via an accelerometer of the MCD and/or the reference device. As illustrated in FIG. 5, the X-axis reading is zero when the vehicle is driving along a straight line and reaches its positive or negative peak when the vehicle goes into the middle of a turn. The sign of the acceleration on the X-axis may be determined by the turn direction because the centripetal acceleration is always pointing to the center of a turn. Thus, the X-axis acceleration is negative when the vehicle is making a left turn, and vice versa. Additionally, the Yc points to the head of the vehicle. Thus, the Y-axis acceleration reading of the phone may indicate the acceleration of the tangential speed (i.e., v) of the vehicle in a turn.

In certain other embodiments, the MLDS may determine the vehicle dynamics by deriving the turn directions using a Gyroscope of the MCD and/or the reference device. To compare the centripetal acceleration at different positions inside the vehicle, the MLDS may determine the turn direction, i.e., whether the vehicle is making a right turn or a left turn. The Z-axis gyroscope reading on the MCD may be utilized to represent the vehicle angular speed of the turn. FIG. 5 illustrates the rotation rate on Z-axis of a gyroscope on the phone during a left and right turn respectively. A counter clockwise rotation around Z-axis generates positive reading, which indicates the vehicle is making a left turn; otherwise, the gyroscope generates negative reading, indicating the vehicle is turning right.

In step 208, the MLDS may perform a coordinate alignment to align the centripetal acceleration and angular speed derived from the phone sensors with that of the vehicle. In certain embodiments, the coordinate alignment may be performed when the MLDS starts operation. In certain other embodiments, the coordinate alignment may be performed when the MLDS detects the gyroscope readings crossing certain predefined thresholds, which are caused by the change of the phone's position. In certain other embodiments, the coordinate alignment may be performed when the MLDS detects that the vehicle is making a turn based on gyroscope and/or accelerometer readings. In certain embodiments, the MLDS may perform step 208 before step 206.

The MLDS, in step 208, may perform the coordinate alignment by running a coordinate alignment sub-task (described below with respect to FIG. 2B) to align the phone's coordinate system with the vehicle's, by utilizing the accelerometers and gyroscopes located on the MCD.

Figure 4B:
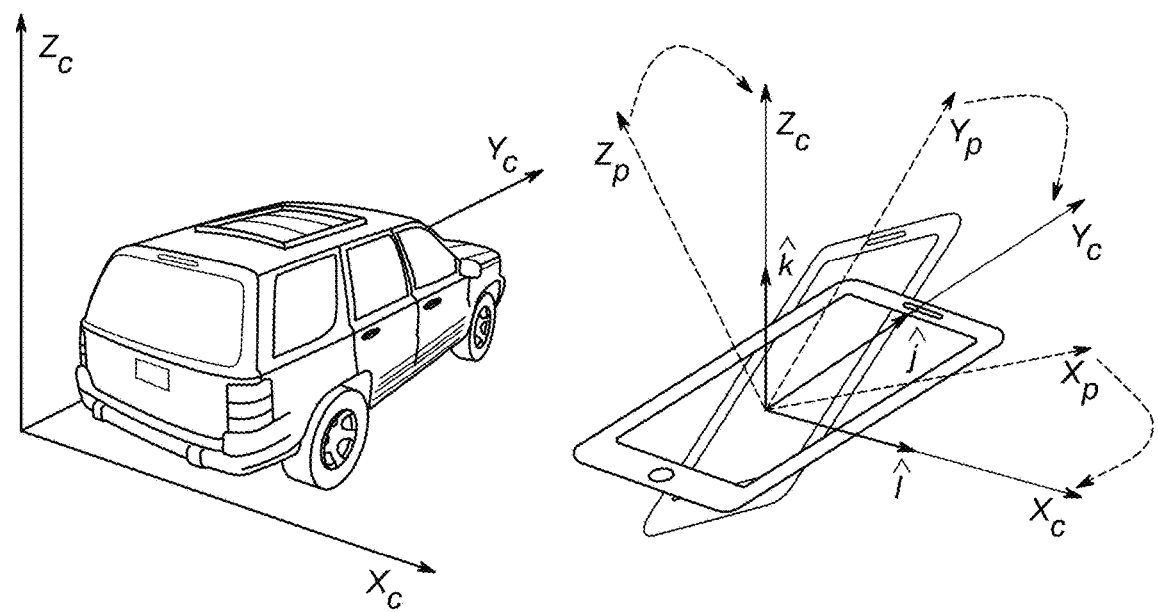
FIG. 4B depicts an example coordinate alignment, according to an embodiment.

As illustrated in FIG. 4B, the phone's coordinate system ({Xp, Yp, Zp}) may be determined by the pose of the phone inside the vehicle. The MLDS may then find a representation of orientation such as a rotation matrix R to rotate the phone's coordinate system to match with that of the vehicle's ({Xc, Yc, Zc}). The three unit coordinate vectors under the vehicle's coordinate system are defined as $\hat{i}$, $\hat{j}$ and $\hat{k}$ for Xc, Yc and Zc axis respectively (i.e., $\hat{i}=[1,0,0]^T$ in vehicle's coordinate system). The corresponding coordinates of these three unit vectors in the MCD's coordinate system as:

$$\hat{q} = [x_q, y_q, z_q]^T \quad (2)$$

where q∈i,j,k, and the rotation axis is given by:

$$R = \begin{Bmatrix} x_i & x_j & x_k \\ y_i & y_j & y_k \\ z_i & z_j & z_k \end{Bmatrix} \quad (3)$$

Figure 2B:
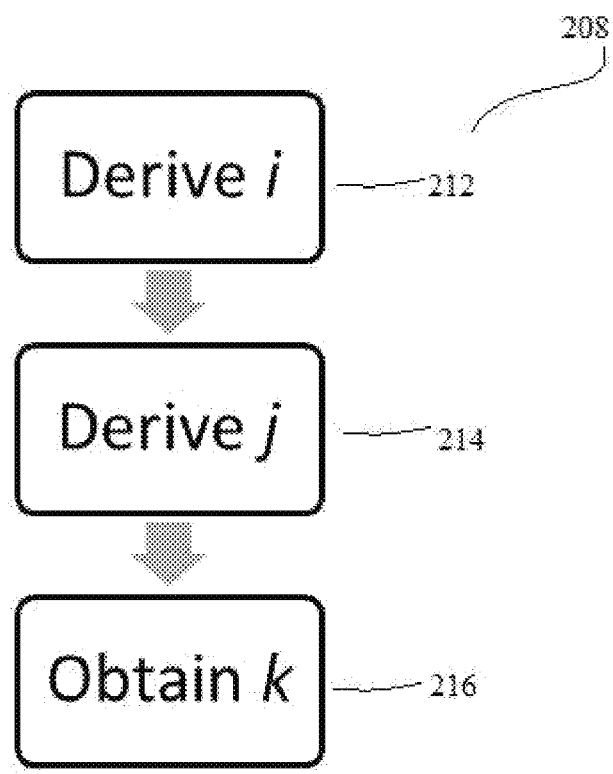
FIG. 2B is a flow diagram of an example coordinate alignment process, according to an embodiment.

The coordinate alignment sub-task utilizing the MCD's accelerometer and gyroscope readings to obtain each element in the rotation matrix R may consist of the three steps shown in FIG. 2B In the first step 212, the MLDS may derive $\hat{k}$ by applying a low pass filter (e.g., exponential smoothing) on the three axes accelerometer readings on the phone to obtain the constant components from these three accelerations and derive the gravity acceleration, which is then normalized to generate the unit vector $$\hat{k} = [x_k, y_k, z_k]^T.$$

In the second step 214, the MLDS may derive by utilizing $\hat{j}$ the fact that the three axes accelerometer readings of the phone are caused by vehicle's acceleration or deceleration when driving straight. For example, the MLDS may obtain $$\hat{j} = [x_j, y_j, z_j]^T$$

through extracting the accelerometer readings when the vehicle decelerates (e.g., the vehicle usually decelerates before making turns or encountering traffic lights and stop sign). The gyroscope is used to determine whether the vehicle is driving straight (i.e., with zero rotation rate). It should be noted that the gravity component needs to be excluded because it distributes on all three axes of the phone when the phone's coordinate system is not aligned with the vehicle.

In the third step 216, the MLDS may derive $\hat{i}$ as $$\hat{i} = \hat{j} \times \hat{k} = [x_i, y_i, z_i]^T$$

since the coordinate system follows the right hand rule.

After obtaining the rotation matrix R, given the sensor reading vector in the phone's coordinate system S, the MLDS may obtain the rotated sensor reading vector S' aligned with the vehicle's coordinate system by applying a rotation matrix R as: S'=S×R. Other existing methods may be utilized to calibrate the coordinate systems between the phone and the vehicle, using the sensors embedded in the MCD In certain embodiments, the method described above may also be used to for estimating the orientation of the mobile communication device with respect to the vehicle. Estimating an orientation of the mobile device may be helpful to determine who can (driver and/or passenger) can view the mobile device, automatically activate or deactivate the screen when the screen is visible or invisible (e.g., to save battery life), and/or translate and interpret orientation dependent sensor data (e.g., accelerometer, gyroscope, magnetometer, ambient light sensor, camera, etc.). In an embodiment, translating and interpreting orientation dependent sensor data may have the following applications (without limitation): track vehicle movements to provide safety warnings to drivers, provide feedback on driving style from a safety or energy usage perspective, monitor driving style of new drivers, detect dangerous road conditions, and/or track driver behavior for insurance rate adjustments or discounts.

In an embodiment, the MLDS may automatically update the orientation estimation upon detecting a change in the orientation.

Referring back to FIG. 2A, in step 210, the MLDS may further calibrate the data collected by the MCD, and/or data reported by the reference device. The data calibration process may include three steps: data interpolation, trace synchronization, and acceleration adjustment, which aims to synchronize the traces from different sources and reduce the hardware bias caused by different phone models.

The MLDS may run a sub-task to perform data calibration. In real-road driving environments, many factors (such as running engines and wind) may affect the readings from the accelerometers and gyroscopes on smartphones. The sensor readings obtained may thus be noisy and unreliable. To address this issue, the MLDS may perform data calibration for robust detection. The data calibration sub-task may perform one or more of the following (as discussed below): filter noise from sensor readings, ensure the synchronization between sensor readings from different sources, reduce bias caused by hardware difference in smartphones, and/or other known data calibrations known in the art. Some examples of data calibration may include one or more of the following:

A) Noise Filtering: In certain embodiments, the MLDS may perform data interpolation to reduce the noise in readings obtained from the accelerometers, by applying a moving average filter to the sensor readings. However, although a fixed sampling rate is used, the real sampling interval may have a small variation. Therefore, before applying the moving average filter, the MLDS may interpolate to estimate the samples at evenly spaced time series points, i.e. $[t_0, t_0+\delta, t_0+2\delta, \ldots]$, where $\delta$ is the interpolation step and $t_0$ is the starting time stamps for the readings. Similarly, the MLDS may apply interpolation to readings from the gyroscope to obtain a uniform time interval between consecutive samples for comparison. In certain embodiments, a time window of 5 samples for the moving average filter, and a $\delta$ of 0.05 s for the interpolation step may be used. Other suitable methods may be used to filter the noise.

B) Trace Synchronization: The MLDS may utilize this procedure to synchronize the sensor readings from the phone and the readings at the reference device (e.g., the cigarette lighter adapter or OBD-II port adapter) since these readings come from two sources with different clocks. For example, in an embodiment, two types of reference data may be involved: the centripetal acceleration of the vehicle (reference acceleration from the cigarette lighter adapter), and the speed of the vehicle (reference speed from OBD-II port adapter). To synchronize the phone's centripetal acceleration readings with the ones from the reference acceleration, the MLDS may calculate the cross correlation between these two sequence of readings in time series. When the cross correlation reaches to maximum, these two sequence of readings may be synchronized because both sequences reflect vehicle's movement.

Figure 6:
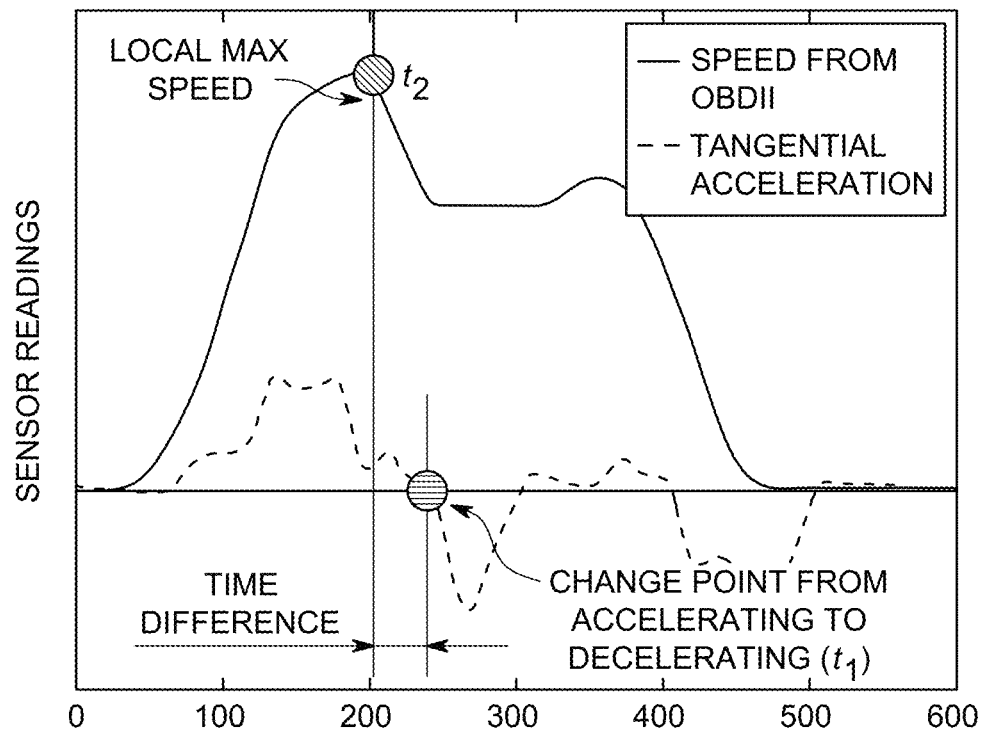
FIG. 6 comprises two graphs illustrating trace synchronization mechanism via tangential acceleration.
Figure 6:
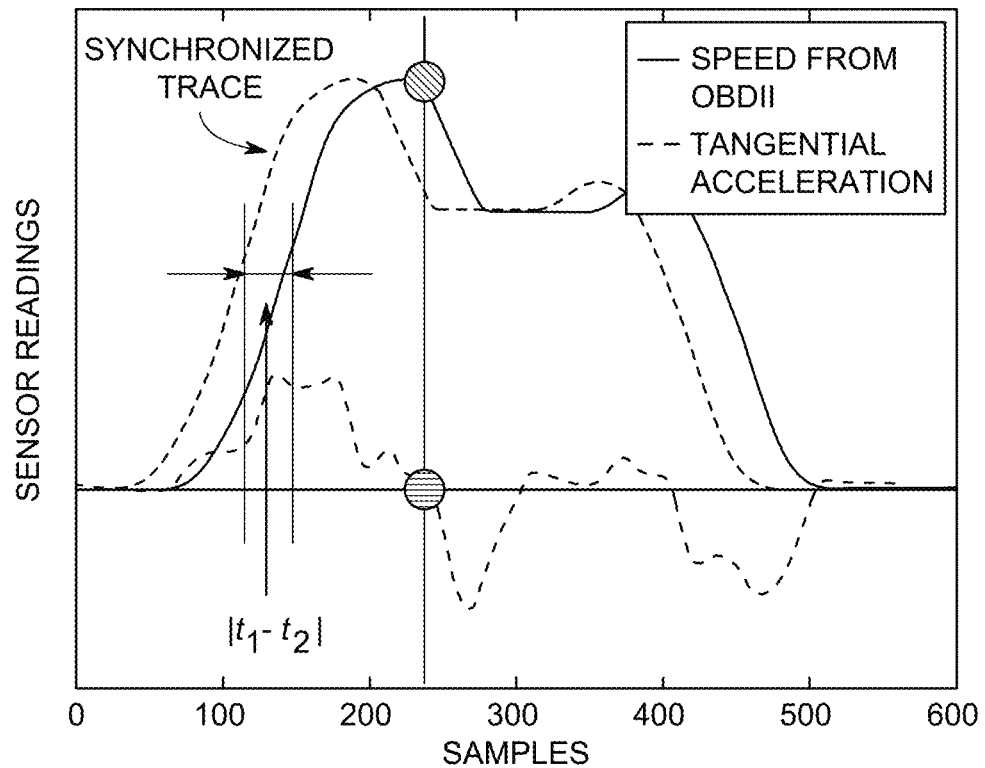

In certain embodiments, when only the speed obtained from the OBD-II port adapter is used as the reference point, the synchronization mechanism may utilize vehicle's acceleration, leveraging the change point in the tangential acceleration during normal driving, to synchronize the trace of reference speed from OBD-II with the acceleration reading trace from the MCD in time series. The rationale behind this mechanism is that the time point that the vehicle changes from acceleration to deceleration during normal driving is the point that the vehicle reaches its maximum speed. FIG. 6 illustrates how the tangential acceleration value change facilitates the synchronization with the reference speed trace. The time ($t_2$) that the reference speed from OBD-II reaches its local maximum should match the time ($t_1$) that the vehicle's tangential acceleration (i.e. the acceleration on the Y axis) changes from positive to negative. Thus, for the reference speed trace (from OBD-II), the MLDS performs synchronization by subtracting the time difference ($t_2-t_1$) from all its time stamps.

C) Acceleration Adjustment: The MLDS may use acceleration adjustment to reduce the bias caused by hardware differences in smartphones through adjusting the centripetal acceleration of the MCD. Because the centripetal acceleration only exists during a turn, the readings on the X-axis accelerometer of the MCD should be zero when the vehicle is moving along a straight line. Nevertheless, the acceleration on the X-axis has a constant value different from zero due to different hardware characteristics in different phone models. To reduce such a bias, the MLDS may perform the following adjustment: 1) use the MCD's gyroscope to determine the time period that the vehicle is driving along a straight line, i.e., the time period with no rotation rate on the Z-axis gyroscope; 2) calculate the mean value of the X-axis acceleration during this time period; and (3) subtract the calculated mean value from all the X-axis acceleration readings to remove the constant bias.

Finally, in step 220, the MLDS may determine the MCD's position in a vehicle by leveraging the cumulative difference of centripetal acceleration (e.g., k samples around the maximum angular speed) and combining the turn direction determined from the sign of the angular speed.

The MLDS may determine the difference of centripetal acceleration between two in-vehicle positions by the angular speed and relative distance between these two positions. For example, when the vehicle is making a left turn, the radius of the target phone is $r_L$, and the radius of the reference position is thus $r_{LM}=r_L+r$, where r is the relative distance between the target position and the reference position. The difference of centripetal acceleration between these two positions can then be represented as:

$$\Delta \alpha_L = \alpha_L - \alpha_{LM} = \omega_L^2 r_L - \omega_L^2 (r_L + \Delta_r) = -\omega_L^2 \Delta r \quad (5)$$

Similarly, when the vehicle is making a right turn, the difference of centripetal acceleration between the target phone and the reference position is $\Delta \alpha_R = \omega_R^2 \Delta r$. Based on the equations above, the difference of the centripetal acceleration between two positions inside the vehicle may be determined by the angular speed of the vehicle and the distance between these two positions.

The above equations show that the difference of centripetal acceleration only depends on the relative distance between two positions inside the vehicle and angular speed during the turn. Thus, using the difference of centripetal acceleration is scalable to handle any turns with different radii. The larger the angular speed is, the more powerful the discrimination becomes in the centripetal acceleration when sensing driver phone use. Moreover, when undergoing left turns, the centripetal acceleration of the driver phone is smaller than that at the reference point (such as the cigarette lighter adapter and OBD-II port adapter), whereas it is larger than that of the reference point when going through right turns. Therefore, given the difference of the centripetal acceleration and the turning direction, the MLDS is able to determine whether the phone is a driver phone or passenger one. Specifically, the MLDS algorithm determines the driver phone use within a single turn using the following hypothesis test:

$$\begin{cases} (a-a_M)\omega > 0, & \mathcal{H}_0 : \text{passenger phone} \\ (a-a_M)\omega < 0, & \mathcal{H}_1 : \text{driver phone} \end{cases} \quad (6)$$

where:
$\alpha$=centripetal acceleration of the smartphone measured from its X-axis accelerometer,
$\alpha_M$=centripetal acceleration of the reference position, and
$\omega$=angular speed measured from smartphone's Z-axis gyroscope sensor. The sign of $\omega$ reflects the turn direction, e.g., w is positive when the vehicle is making a left turn.

Finally, the MLDS may accumulate the differences of centripetal acceleration within a turning period to improve the detection robustness. For example, in certain embodiments, the MLDS may utilize at least about 20 samples of acceleration readings at the time when the angular speed reaches its maximum value. The cumulative difference of centripetal acceleration may then be combined together with the turning direction to determine whether the target MCD is on the driver side or the passenger side.

In certain embodiments, the MLDS may further improve the detection performance by combining multiple single turn results (e.g., N turns) through simple majority voting process:

$$\begin{cases} \sum_{i=1}^{N} \dfrac{(a^i - a_M^i)\omega^i}{|(a^i - a_M^i)\omega^i|} > 0, & \mathcal{H}_0 : \text{passenger phone} \\ \sum_{i=1}^{N} \dfrac{(a^i - a_M^i)\omega^i}{|(a^i - a_M^i)\omega^i|} < 0, & \mathcal{H}_1 : \text{driver phone} \end{cases} \quad (7)$$

where:
$a_i$=MCD's centripetal acceleration,
$a_{iM}$=reference centripetal acceleration, and
$\omega_i$=MCD's angular speed,
in $i^{th}$ turn.

In certain embodiments, the MLDS may perform the detection using mixed turns. The accuracy of the reference point affects the performance of the MLDS sensing algorithm because the observations from the reference point can be biased. For example, the vehicle speed provided by OBD-II may be an overestimation possibly due to worn tires. Such a bias may affect the MLDS algorithm accuracy when using the difference of centripetal acceleration within the same turn. Since a vehicle usually undergoes multiple turns during a trip, the MLDS can exploit the centripetal acceleration obtained from mixed turns, i.e., comparing the normalized centripetal acceleration of the phone under a left turn to that of a right turn. The normalized centripetal acceleration is defined as the ratio of the measured centripetal acceleration of the MCD to the centripetal acceleration derived from the reference point. Using normalized centripetal acceleration may enable the MLDS algorithm to work with mixed turns with different turn sizes and driving speeds encountered under real road driving environments. In an embodiment, the MLDS may automatically launch this detection once a left turn and a right turn are identified based on gyroscope readings, irrespective of the sequence of these turns.

Impact of Bias. The reference centripetal acceleration $\alpha_{LM}$, the unbiased centripetal acceleration of the reference point (for example under the left turn is expressed as:

$$\alpha'_{LM} = \alpha_{LM}\beta \quad (8)$$

where, $\beta$ is the bias. When the OBD-II port adapter is used as the reference point, $\beta$ comes from the biased estimate of the vehicle speed. Then the difference in centripetal acceleration becomes:

$$\Delta\alpha_L = \alpha_L - \alpha'_{LM} = (1-\beta)\alpha_L - \beta\omega_L^2\Delta r \quad (9)$$

When there is no bias (i.e., $\beta=1$), the above expression becomes Equation (5). However, the existence of bias ($\beta \neq 1$) can arbitrarily change the sign of the difference in centripetal acceleration, making the detection result inaccurate.

Working with Mixed Turns. The MLDS algorithm may also compare the normalized centripetal acceleration of the phone under a left turn to that of a right turn to eliminate the impact of bias coming from the reference point. The normalized centripetal acceleration of the phone under a left and right turn is denoted as and $$\hat{a}_L = \frac{a_L}{a_{LM}^1} \text{ and } \hat{a}_R = \frac{a_R}{a_{RM}^1},$$

respectively. The difference of the normalized centripetal acceleration under the left and right turn can then be expressed as:

$$\Delta\hat{a}_r = \hat{a}_L - \hat{a}_R \quad (10)$$
$$= \frac{a_L}{a_{LM}^1} - \frac{a_R}{a_{RM}^1}$$
$$= \frac{a_L}{a_{LM}\beta} - \frac{a_R}{a_{RM}\beta}$$
$$= \frac{1}{\beta}\left(\frac{a_L}{a_{LM}} - \frac{a_R}{a_{RM}}\right).$$

If the phone is at the driver side, $\alpha_{LM}$ is always larger than $$\alpha_L\left(\text{i.e. } \frac{a_L}{a_{LM}} < 1\right),$$

whereas $\alpha_{RM}$ is always smaller than $$\alpha_M\left(\left(\frac{a_R}{a_{RM}}\right) > 1\right).$$

Thus $\Delta\hat{a}_r < 0$. Similarly, if the phone is at the passenger side, $\Delta\hat{a}_r > 0$. Thus, the sign of $\Delta\hat{a}_r$ becomes independent of the bias, turn size and driving speed. Hence the MLDS driver phone sensing with mixed turns may be formulated by the MLDS algorithm as:

$$\begin{cases} \hat{a}_L - \hat{a}_R > 0, & \mathcal{H}_0 : \text{passenger phone} \\ \hat{a}_L - \hat{a}_R < 0, & \mathcal{H}_1 : \text{driver phone} \end{cases} \quad (11)$$

The MLDS may intelligently perform driver phone detection based on the availability of turns. Specifically, when a single turn is available, the may MLDS apply the algorithm involving the single turn. When multiple/mixed turns are available, the MLDS performs more accurate driver phone detection using accumulative multiple/mixed turns In an embodiment, the MLDS may modify 222 at least one feature of the MCD in response to the detection of the position of the MCD in the vehicle. For example, in an embodiment, the MLDS may disable the communications functions (text, voice call, etc.) of the MCD in response to detecting that the MCD is located on the driver side of the vehicle (i.e., in response to detecting use of a mobile device by the driver). In another embodiment, the MLDS may change the mobile device to an airplane mode in response to detecting that the MCD is located on the driver side of the vehicle. In yet another embodiment, the MLDS may activate the navigation system of the mobile device mode in response to detecting that the MCD is located on the passenger side of the vehicle. It will be understood to those skilled in the art that the above examples are not limiting.

It will be understood to those skilled in the art that other uses of detecting the location of an MCD are within the scope of this disclosure. For example, in at least one embodiment, an alarm may be triggered at the first device, the reference device, and/or the device associated with the microprocessor upon detecting that the mobile device is located at the driver side and is in an active communication mode.

In another embodiment, vehicle functions may be controlled in response to detecting the location of the MCD. For example, seat specific functions such as adjusting the car reading lights, adjusting the audio system, etc. may be performed in response to the MCD location detection. Such controls may be automatically programmed and/or a user may be provided an option to program the controls. Similarly, screen sharing on seat specific displays(in the head-rest and/or dashboard) may be adjusted for optimal viewing and/or preventing driver distraction.

Figure 2C:
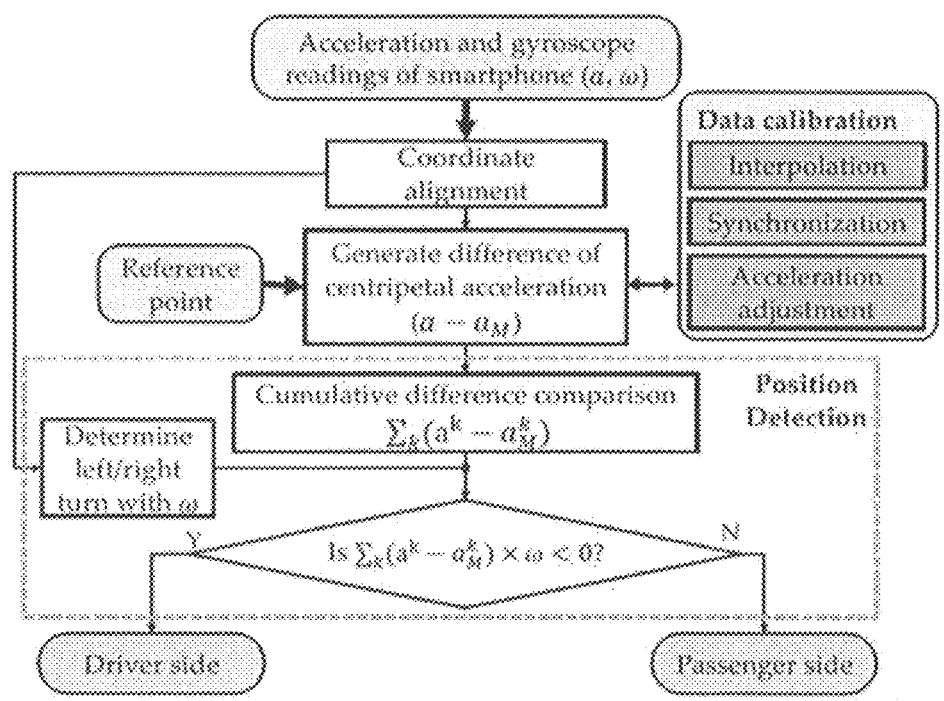
FIG. 2C is an overview of the method flow, according to an embodiment of the current disclosure.

FIG. 2C illustrates an overview of the system flow in accordance with the principles of FIG. 2A discussed above.

In an embodiment, the MLDS may be a software application of the MCD. In certain other embodiments, the MLDS may be included in the reference device. Alternatively or additionally, the MLDS may be included in a third device separate from the MCD and the reference device. The third device may be in communication with the MCD and/or the reference device.

Figure 3:
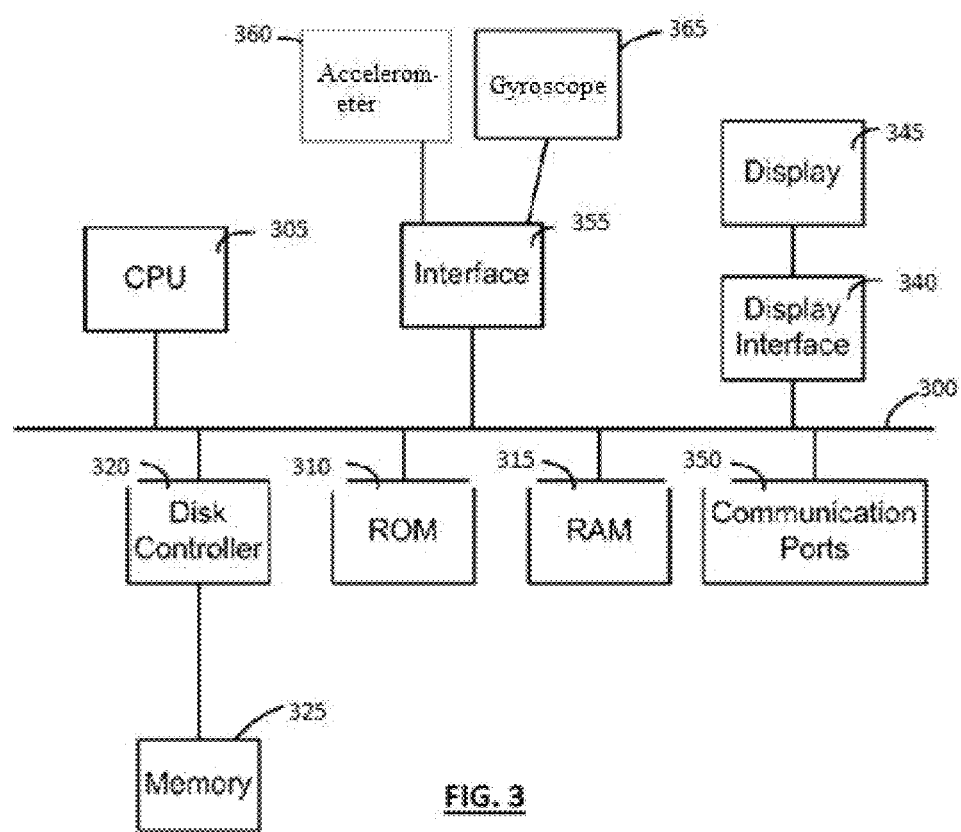
FIG. 3 depicts various embodiments of a communication device for using the systems and processes described in this document.

FIG. 3 depicts an example of internal hardware that is used to contain or implement the various computer processes and systems as discussed above. For example, the MLDS discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. As used in this document and in the claims, the term "processor" refers to a single processor or any number of processors in a set of processors. Read only memory (ROM) 310 and random access memory (RAM) 315 constitute examples of memory devices.

A controller 320 interfaces with one or more optional memory devices 325 that service as date storage facilities to the system bus 300. These memory devices 325 include, for example, an external or internal disk drive, a hard drive, flash memory, a USB drive or another type of device that serves as a data storage facility. As indicated previously, these various drives and controllers are optional devices. Additionally, the memory devices 325 can be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above can be stored in the ROM 310 and/or the RAM 315. Optionally, the program instructions can be stored on a non-transitory, computer readable medium such as a compact disk, a digital disk, flash memory, a memory card, a USB drive, an optical disc storage medium, and/or other recording medium.

An optional display interface 340 permits information from the bus 300 to be displayed on the display 345 in audio, visual, graphic or alphanumeric format. Communication with external devices may occur using various communication ports 350. A communication port 350 is attached to a communications network, such as the Internet, a local area network or a cellular telephone data network.

The hardware may also include an interface 355 which allows for receipt of data from embedded sensor devices such as an accelerometer 360 or gyroscope 365 and/or other embedded sensors.

In view of the forgoing, a driver mobile phone use detection system has been provides that requires minimal hardware and/or software medications on MCDs. The present system achieves this by leveraging the existing infrastructure of MCDs and embedded sensors.

What is claimed is:

1. A method for determining the position in a vehicle of a first device in communication with a microprocessor, the method comprising:
   receiving, at the microprocessor, a first set of inertial data from at least one sensor of the first device, wherein the first set of inertial data comprises one or a plurality of centripetal accelerations of the first device associated with the vehicle making at least one turn;
   receiving, at the microprocessor, a second set of inertial data from at least one sensor of a reference device disposed within the vehicle, wherein the second set of inertial data comprises one or a plurality of centripetal accelerations of the reference device associated with the vehicle making at least one turn; and
   determining, using the microprocessor, the position of the first device in the vehicle based on at least one difference between the first set of inertial data and the second set of inertial data by:
      determining whether the vehicle is making a right turn or a left turn, and
      processing the plurality of centripetal accelerations of the first device and the plurality of centripetal accelerations of the reference device for the at least one turn to determine, using the microprocessor, the position of the first device in the vehicle based on differences in the two sets of centripetal accelerations;
   wherein determining the position of the first device comprises detecting for the first device a relative lateral position with respect to a vehicle center, and
   wherein the reference device in the vehicle is one of the following:
      a device fixed at a reference point in the vehicle;
      a device connected to an onboard diagnostics system;
      a component of the vehicle;
      a second device within the vehicle; or
      a second device at an unknown position.

2. The method of claim 1, further comprising aligning, by the microprocessor, a coordinate system of the first device with a coordinate system of the vehicle.

3. The method of claim 2, wherein aligning the coordinate system of the first device with the coordinate system of the vehicle comprises:
   obtaining a representation of orientation using the first set of inertial data; and
   rotating the coordinate system of the first device using the representation of orientation.

4. The method of claim 1, wherein the second set of inertial data is estimated from vehicle position data or speed data.

5. The method of claim 1, wherein determining the position of the first device comprises detecting whether the relative lateral position of the first device with respect to the vehicle center is on a driver side or a passenger side of the vehicle.

6. The method of claim 5, further comprising:
   determining that the first device is in an active communications mode upon detecting that the first device is located on the driver side of the vehicle; and
   triggering an alarm in at least one of the following: the first device, the reference device, or a device associated with the microprocessor.

7. The method of claim 6, further comprising modifying at least one feature of the first device upon detecting that the first device is located on the driver side of the vehicle.

8. The method of claim 7, wherein modifying the at least one feature of the first device comprises at least one of the following:
   silencing incoming communication notifications of the first device;
   silencing notifications of the first device;
   switching to a driver-friendly user interface; or
   diverting incoming communications to another device.

9. The method of claim 5, further comprising modifying at least one feature of the first device upon detecting that the first device is located on the passenger side of the vehicle.

10. The method of claim 1, wherein the at least one sensor of the first device is an accelerometer or a gyroscope of the first device.

11. The method of claim 1, further comprising determining that the first device is on a driver side of the vehicle:
   if it is determined that the vehicle is making a right turn and the cumulative difference is positive; or
   if it is determined that the vehicle is making a left turn and the cumulative difference is negative.

12. The method of claim 11, further comprising estimating a centripetal acceleration of a reference point in the vehicle using the reference device located at a point other than the reference point within the vehicle, wherein the reference point is at a central location in the vehicle.

13. The method of claim 12, further comprising determining that the first device is on a passenger side of the vehicle:
- if it is determined that the vehicle is making a right turn and the cumulative difference is negative; or
- if it is determined that the vehicle is making a left turn and the cumulative difference is positive.

* * * * *